US010233598B2

(12) United States Patent
Lee et al.

(10) Patent No.: US 10,233,598 B2
(45) Date of Patent: Mar. 19, 2019

(54) ROTOR POSITION INDICATION SYSTEM (71) Applicant: Caterpillar Paving Products Inc., Brooklyn Park, MN (US)

(72) Inventors: Alexis J. Lee, Saint Paul, MN (US); Robert E. Carr, Sebastian, FL (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 296 days.

(21) Appl. No.: 15/238,018

(22) Filed: Aug. 16, 2016

(65) Prior Publication Data

US 2018/0051427 A1    Feb. 22, 2018

(51) Int. Cl.
*E01C 23/088* (2006.01)
*E01C 23/12* (2006.01)
*B60Q 1/26* (2006.01)

(52) U.S. Cl.
CPC .............. *E01C 23/088* (2013.01); *B60Q 1/26* (2013.01); *E01C 23/127* (2013.01); *E01C 23/12* (2013.01)

(58) Field of Classification Search
CPC ................................ E01C 23/088; E01C 23/12
See application file for complete search history.

(56) References Cited

U.S. PATENT DOCUMENTS

| | | | |
|---|---|---|---|
| 7,510,347 | B2 | 3/2009 | Lemke |
| 8,690,474 | B2 | 4/2014 | Jurasz et al. |
| 8,757,730 | B2 | 6/2014 | Wachsmann et al. |
| 8,926,024 | B2 | 1/2015 | Shima et al. |
| 9,121,146 | B2 | 9/2015 | Paulsen et al. |
| 9,121,148 | B2 | 9/2015 | Johnson |
| 9,267,249 | B2 | 2/2016 | Simon |
| 2011/0268503 | A1 | 11/2011 | Hall et al. |
| 2012/0104828 | A1 | 5/2012 | Grathwol |
| 2016/0340842 | A1* | 11/2016 | Adams .................. E01C 23/088 |

FOREIGN PATENT DOCUMENTS

| | | | |
|---|---|---|---|
| DE | 3504611 | A1 * | 8/1986 |
| DE | 102011113752 | | 3/2013 |

* cited by examiner

*Primary Examiner* — Sunil Singh
(74) *Attorney, Agent, or Firm* — Oblon, McClelland, Maier & Neustadt (57) ABSTRACT

A rotor position indication system for a milling machine is provided. The rotor position indication system includes a height-adjustable rotor having a plurality of cutting tools and a front impact point. During a cutting process, the rotor removes a layer from a ground surface creating a milled ground surface. The front impact point is a point on the ground surface where cutting will stop if the cutting process is terminated. Further, the rotor position indication system includes a light emitting device configured to emit a light signal. The light signal aligns with the front impact point and shows the front impact point.

16 Claims, 5 Drawing Sheets

ROTOR POSITION INDICATION SYSTEM

TECHNICAL FIELD

The present disclosure relates to a rotor position indication system, and more particularly to a rotor position indication system for a milling machine.

BACKGROUND

Milling machines are used for scarifying, removing, mixing, or reclaiming material from grounds, roadbeds, and similar surfaces. Milling machines, such as cold planers and rotary mixers, have a rotor enclosed within a chamber. The rotor includes a cylindrical drum and a number of cutting tools mounted on the cylindrical drum. When the machine is cutting, the rotor is lowered to a selected depth and the rotation drum causes the cutting tools to impact the ground surface and break it apart.

Typically, a cutting width of the rotor is defined as width of an outer surface of the rotor in contact with a ground surface. As the rotor is generally cylindrical in shape, the cutting width varies as the rotor is moved vertically relative to the ground surface. While the milling machine is operational, position of the rotor is an important parameter. For example, while performing a cutting operation on the ground surface, the operator needs to align the rotor with where a cut needs to begin and where the cut should conclude. Further, an operator seated on the machine should be made aware of a distance between the rotor and any obstacles in the route of the milling machine.

Normally, the machine includes graduated marks on the side plates of the rotor chamber for indicating a position of the rotor within the ground. However, the graduated marks may not be easy to view from an operator platform of the machine. Further, the graduated marks may get covered by dirt and dust during machine operation, making it difficult for the operator to view these graduated marks and accurately observe a length of a cutting edge of the machine.

U.S. Pat. No. 9,121,146 describes a system provided for determining a volume of material milled, or a surface area milled, by a construction machine having a milling drum. The volume of material milled is determined as a function of a cross-sectional area of material to be milled in front of the milling drum and a distance traveled by the construction machine while actively milling. The cross-sectional area is determined in part by direct machine observation of one or more profile characteristics of a ground surface in front of the milling drum. The surface area milled is determined as a function of the width of the area to be milled in front of the milling drum and a distance traveled by the construction machine while actively milling.

SUMMARY OF THE DISCLOSURE

In an aspect of the present disclosure, a rotor position indication system for a milling machine is provided. The rotor position indication system includes a height-adjustable rotor having a number of cutting tools and having a front impact point. During a cutting process, the rotor removes a layer from a ground surface creating a milled ground surface. The front impact point is a point on the ground surface where cutting will stop if the cutting process is terminated. The rotor position indication system further includes a light emitting device configured to emit a light signal illustrating the front impact point.

In another aspect of the present disclosure, a rotor position indication system for a milling machine operating on a ground surface is provided. The rotor position indication system includes a height-adjustable rotor having a number of cutting tools and having a rear impact point. During a cutting process, the rotor removes a layer from a ground surface creating a milled ground surface. The rear impact point is a point on the ground surface where cutting will start if the cutting process is commenced. The rotor position indication system further includes a light emitting device configured to emit a light signal illustrating the rear impact point.

In yet another aspect of the present disclosure, a cold planer is provided. The cold planer includes a rotor chamber having a side plate and a height-adjustable rotor. The rotor includes a number of cutting tools and has a front impact point. During a cutting process, the rotor removes a layer from a ground surface creating a milled ground surface. The front impact point is a point on the ground surface where cutting will stop if the cutting process is terminated. The cold planer further includes a light emitting device configured to emit a light signal illustrating the front impact point. Other features and aspects of this disclosure will be apparent from the following description and the accompanying drawings.

DETAILED DESCRIPTION

Wherever possible, the same reference numbers will be used throughout the drawings to refer to the same or the like parts. Also, corresponding or similar reference numbers will be used throughout the drawings to refer to the same or corresponding parts.

Figure 1:
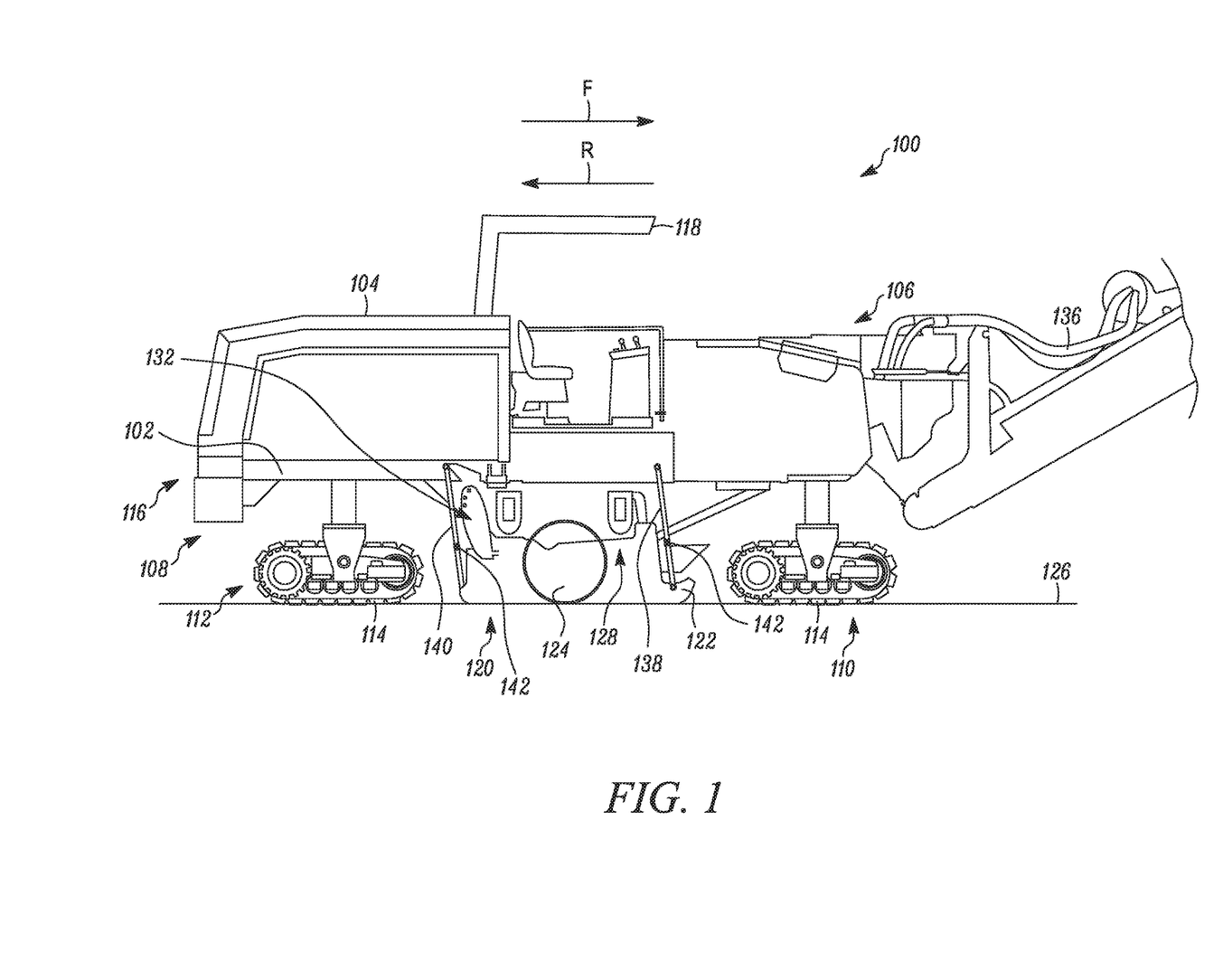
FIG. 1 is a side view of an exemplary milling machine, according to one embodiment of the present disclosure.

FIG. 1 is a side view of an exemplary milling machine 100, according to one embodiment of the present disclosure. The milling machine 100 is a cold planer. Alternatively, the milling machine 100 may embody another machine that removes materials, such as asphalt, from a ground surface 126 or roadbed, such as a rotary mixer. The milling machine 100 has a frame 102. An engine enclosure 104 is attached to the frame 102 and houses an engine (not shown). The engine is generally an internal combustion engine and provides propulsion power to the milling machine 100 and also powers various components of the milling machine 100.

The milling machine 100 has a front end 106 and a rear end 108. The front end 106 of the milling machine 100 has a front drive assembly 110 and the rear end 108 has a rear drive assembly 112. Each of the front and rear drive assemblies 110, 112 include a pair of tracks 114. Alternatively, the milling machine 100 may include wheels (not shown). The tracks 114 are provided on each of a right side 116 and a left side (not shown) of the milling machine 100. The right side 116 and the left side of the milling machine 100 are defined along a forward direction "F" of travel of the milling machine 100. The left side of the milling machine 100 is opposite to the right side 116. The tracks 114 allow movement of the milling machine 100 on the ground surface 126. The tracks 114 allow the milling machine 100 to move in the forward direction "F" or a reverse direction "R". The tracks 114 may be driven by a hydraulic system of the milling machine 100.

The milling machine 100 has an operator platform 118. An operator of the milling machine 100 may sit or stand at the operator platform 118 to operate the milling machine 100. Further, the milling machine 100 includes a rotor chamber 120 positioned between the front and rear drive assemblies 110, 112. The rotor chamber 120 includes a first side plate 122 provided at the right side 116 of the milling machine 100 and a second side plate (not shown) provided at the left side of the milling machine 100. The first side plate 122 is vertically movable by a first hydraulic cylinder 138 and a second hydraulic cylinder 140. The second side plate is similar in design and also operates similar to the first side plate 122. The milling machine 100 includes a pair of sensors 142. The sensors 142 are each coupled to the first and second hydraulic cylinders 138, 140. The sensors 142 are indicative of the movement of the first side plate 122.

A height-adjustable rotor 124, hereinafter referred as rotor 124, lies within the rotor chamber 120. The rotor chamber 120 is an enclosed space around the rotor 124 defined by the first side plate 122 and the second side plate on the right side 116 and the left side of the milling machine 100 respectively. The rotor 124 is positioned between the first side plate 122 and the second side plate. Further constructional details of the rotor 124 are illustrated in FIG. 2.

Figure 2:
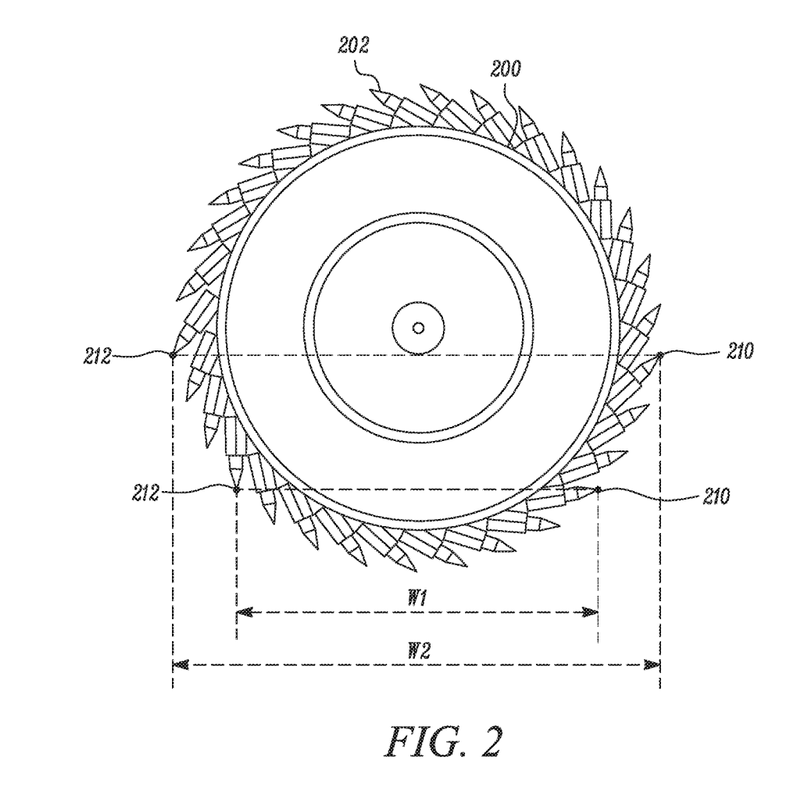
FIG. 2 is a side view of a rotor of the milling machine showing front impact points and rear impact points for two positions of the rotor, according to an embodiment of the present disclosure.

As shown in FIG. 2, the rotor 124 has a generally cylindrical drum 200 having a number of cutting tools 202 disposed in various formations along the outer surface. Generally, when the rotor 124 is not in use, the rotor 124 is positioned such that the rotor 124 does not contact the ground surface 126. While performing an operation, for example a cutting operation, the rotor 124 is rotated at a pre-determined speed. The speed may be determined based on texture of the ground surface 126 and structural properties of the cutting tools 202. Various other parameters may also be taken in account to determine the speed of rotation of the rotor 124. According to the need of the application, the rotor 124 is lowered so that the rotor 124 contacts the ground surface 126 and cuts the ground surface 126 through force applied by the cutting tools 202 on the ground surface 126.

As the rotor 124 is generally cylindrical in shape, contact area of the rotor 124 with the ground surface 126 varies with height/depth of the rotor 124 relative to the ground surface 126. A width of the contact area of the rotor 124 with the ground surface 126 is defined as a cutting width of the rotor 124. Consequently, the cutting width also varies with the height/depth of the rotor 124 relative to the ground surface 126.

A front impact point 210 and a rear impact point 212 are defined relative to position of the rotor 124 with reference to the ground surface 126. The front impact point 210 is a set of points on the ground surface 126 where cutting of the ground surface 126 will stop if the cutting operation is terminated. Similarly, the rear impact point 212 is a set of points on the ground surface 126 where the cutting of the ground surface 126 will start if the cutting operation is commenced. A cutting width $W_1$ of the rotor 124 in a first position is defined as a perpendicular distance between the front impact points 210 and the rear impact points 212 corresponding to the first position of the rotor 124 relative to the ground surface 126. Similarly, a cutting width $W_2$ in the second position of the rotor 124 is defined as a perpendicular distance between the front impact points 210 and the rear impact points 212 corresponding to the second position of the rotor 124 relative to the ground surface 126. As illustrated, the cutting width $W_2$ in the second position of the rotor 124 has changed accordingly compared to the cutting width $W_1$ in the first position of the rotor 124.

Figure 3:
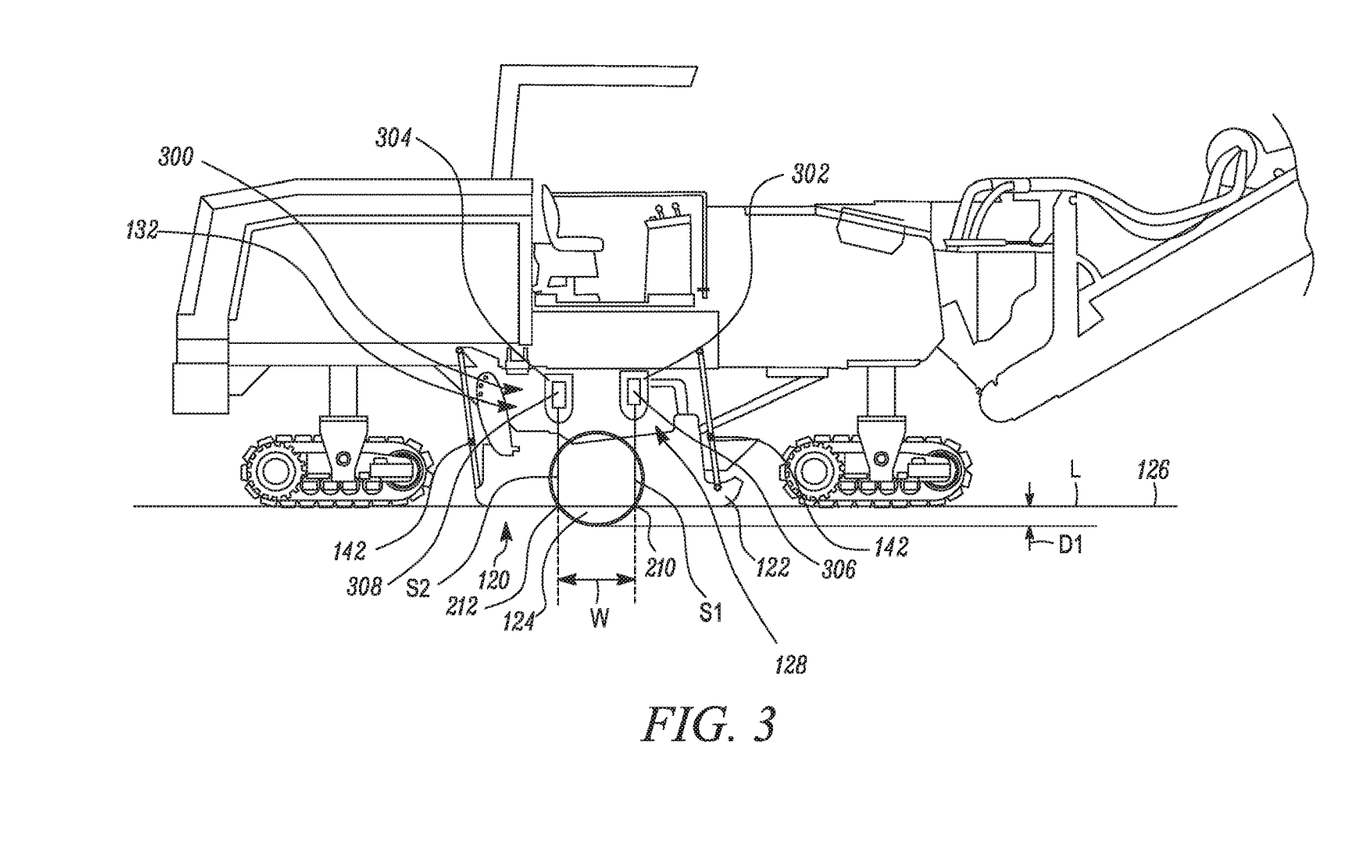
FIG. 3 is a side view of the milling machine having a rotor position indication system indicating a position of the rotor of the milling machine at a first depth, according to an embodiment of the present disclosure.
Figure 4:
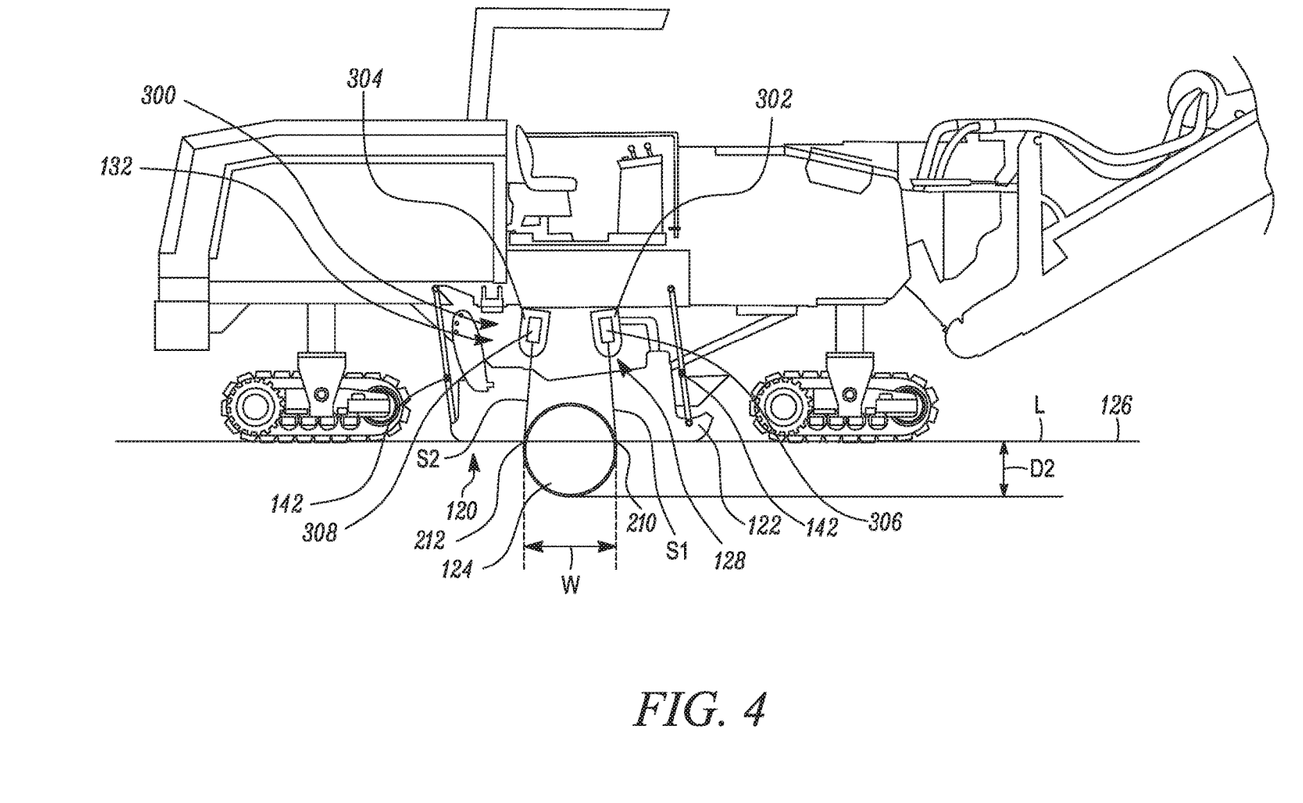
FIG. 4 is a side view of the milling machine having the rotor position indication system indicating the position of the rotor of the milling machine at a second depth, according to an embodiment of the present disclosure.

Referring to FIGS. 3 & 4, the milling machine 100 has a rotor position indication system 300. The rotor position indication system 300 indicates a position of the rotor 124 at various depths of the rotor 124 below a ground level "L". The ground level "L" is defined by the ground surface 126 on which the milling machine 100 is operating. The rotor position indication system 300 includes a first bracket 302 and a second bracket 304 mounted at the right side 116 of the milling machine 100. The rotor chamber 120 houses a first light emitting device 306 and a second light emitting device 308, respectively. In the illustrated embodiment, the first and second light emitting devices 306, 308 are attached to the first and second brackets 302, 304 respectively. It should be contemplated that the first and second light emitting devices 302, 304 may be attached to the first side plate 122 as well. The first and second light emitting devices 306, 308 move based on the movement of the rotor 124 and will be described in detail later in this section.

Further, the rotor position indication system 300 includes a third bracket (not shown) and a fourth bracket (not shown) mounted at the left side of the milling machine 100. The design, operation, and movement of the third bracket is similar to that of the first bracket 302. Further, a design, operation, and movement of the fourth bracket is similar to that of the second bracket 304. The rotor chamber 120 houses a third light emitting device (not shown) and a fourth light emitting device (not shown) respectively. The third and fourth light emitting devices may also be attached to the second side on the left side of the machine. The third and fourth light emitting devices may also be attached to the third and fourth bracket respectively.

For explanatory purposes, the rotor position indication system 300 will be explained in reference to the right side 116 of the milling machine 100. However, it should be noted that the explanation provided is equally applicable to the left side of the milling machine 100. The first bracket 302 of the rotor position indication system 300 is mounted at a first location 128 on the milling machine 100. The first location 128 is defined on the first side plate 122 and proximate to the front end 106 of the milling machine 100. The rotor position indication system 300 also includes the first light emitting device 306. The first light emitting device 306 is coupled to the first bracket 302. In one example, the first light emitting device 306 is a fan laser. The light signal generated by the fan laser has an inherent property of extending on a surface on which the fan laser projects a laser light signal.

The first light emitting device 306 emits a first light signal "S1" (see FIGS. 3 and 4). Based on a movement of the rotor 124, the first light signal "S1" illustrates the front impact point 210 of the rotor 124 of the milling machine 100 and is indicative of the front impact point 210. The first light signal "S1" extends in a direction that is perpendicular to the first side plate 122 on the ground surface 126. In the example, where the first light emitting device 306 is a fan laser, the first light signal S1 is shown extending only up to the ground surface 126. The first light signal S1 does not terminate at the ground surface 126 and extends perpendicular to the first side plate 122 on the ground surface 126.

Further, the rotor position indication system 300 includes the second bracket 304. The second bracket 304 is mounted at a second location 132 on the milling machine 100. The second location 132 is defined on the first side plate 122, proximate to the rear end 108 of the milling machine 100. The rotor position indication system 300 also includes the second light emitting device 308. The second light emitting device 308 is coupled to the second bracket 304. In one example, the second light emitting device 308 is a fan laser.

The second light emitting device 308 emits a second light signal "S2" (see FIGS. 2 and 3). The second light signal "S2" extends in a direction that is perpendicular to the first side plate 122. Based on a movement of the rotor 124, the second light signal "S2" illustrates the rear impact point 212 of the rotor 124 of the milling machine 100 and is indicative of the rear impact point 212. The rear impact point 212 is at a same horizontal level as the front impact point 210 relative to the ground surface 126.

Based on the depth of the rotor 124 below the ground level "L", the first bracket 302 and the first light emitting device 306 rotate to illustrate the front impact point 210 of the rotor 124 with the first light signal "S1". Similarly, the second bracket 304 and the second light emitting device 308 rotate to align the rear impact point 212 of the rotor 124 with the second light signal "S2"

FIGS. 3 and 4 illustrate the first and second brackets 302, 304 in two different positions, based on the depth of the rotor 124 below the ground level "L". FIG. 3 illustrates the first and second brackets 302, 304 in a first position in which the rotor 124 is at a first depth "D1" with respect to the ground level "L". As shown, the first light signal "S1" is illustrates the front impact point 210 of the rotor 124 and the second light signal "S2" illustrates the rear impact point 212 of the rotor 124.

Further, as the rotor 124 is lowered and the depth of the rotor 124 below the ground level "L" increases, the first and second brackets 302, 304 rotate in order to illustrate the front and rear impact points 210, 212 of the rotor 124 with the first and second light signals "S1", "S2" respectively. More particularly, as the depth of the rotor 124 changes, the first and second brackets 302, 304 rotate from the first position to a second position.

FIG. 4 illustrates the first and second brackets 302, 304 in the second position where the rotor 124 is at a second depth "D2" with respect to the ground level "L". Further, based on the change in the depth of the rotor 124, the first and second brackets 302, 304 rotate to the second position in order to illustrate front and rear impact points 210, 212 of the rotor 124 with the first and second light signals "S1", "S2" respectively.

Figure 5:
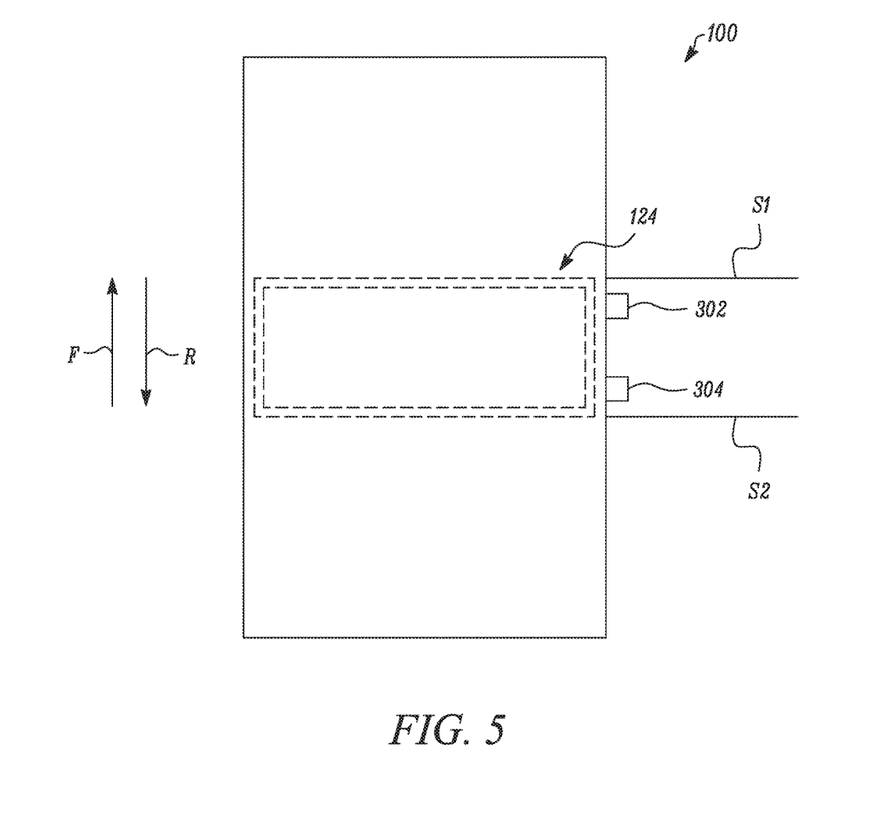
FIG. 5 is a top view of the milling machine showing a first signal and a second signal illustrating the position of the rotor, according to an embodiment of the present disclosure.

Referring to FIG. 5, a top view of the milling machine 100 is illustrated. The top view provides an account of how the operator would perceive the position of the rotor 124 based on the light signals S1 and S2 from the operator platform 118. The first and second light emitting devices 306, 308 generate the light signals S1 and S2 respectively. The light signals S1 and S2 extend on the ground surface 126 perpendicular to the first side plate 122. The light signals S1 and S2 are indicative of the position of the rotor 124 by providing position of the front impact point 210 and the rear impact point 212 respectively. The operator may judge the location of the rotor 124 based on the light signals S1 and S2 and operate the milling machine 100 accordingly.

Further aspects of the present disclosure are described with combined reference to FIGS. 3-5. In one example, each of the first and second brackets 302, 304 rotate mechanically, based on the change in the depth of the rotor 124. More particularly, each of the first and second brackets 302, 304 rotate mechanically as the first side plate 122 moves upwards or downwards. In one example, each of the first and second brackets 302, 304 includes a mechanical linkage. The mechanical linkages associated with the first and second brackets 302, 304 rotate the first and second brackets 302, 304, based on the movement of the first side plate 122.

Each of the mechanical linkages is controlled individually based on the movement of the first side plate 122. Thus, the mechanical linkage may rotate the first and second brackets 302, 304 to different angles with respect to the ground level "L". The mechanical linkages convert a linear movement of the first side plate 122 to a rotational movement of the first and second brackets 32, 304. More particularly, as the first side plate 122 moves up or down vertically, the mechanical linkages cause the first and/or second brackets 302, 304 to rotate.

Further, the movement of the first and second brackets 302, 304 in turn causes the first and second light signals "S1", "S2" to illustrate the front and rear impact points 210, 212 of the rotor 124 respectively. The mechanical linkages associated with the first and second brackets 302, 304 may embody any linkage or a linkage assembly that allows rotation of the first and second brackets 302, 304, based on the movement of the first side plate 122 or the rotor 124, without limiting the scope of the present disclosure.

In another embodiment, the first and second brackets 302, 304 of the rotor position indication system 300 rotate electronically based on the depth of the rotor 124 below the ground level "L". A sensor associated with the rotor position indication system 300 may generate an electronic signal of the depth of the rotor 124 below the ground level "L". In one example, the sensor 142 generates the electronic signal of the depth of the rotor 124 below the ground level "L". In such an example, the sensor 142 generates the electronic signal of the depth of the rotor 124 below the ground level "L", based on the movement of the first side plate 122.

In another example, a depth sensor may provide the electronic signal of the depth of the rotor 124 below the ground level "L". The depth sensor may be already mounted on the milling machine 100. The depth sensor may embody a position sensor that generates a signal of a relative position of the rotor 124 below the ground level "L". In another example, a sensor mounted on a hydraulic linkage that causes the vertical movement of the rotor 124 may provide the electronic signal of the depth of the rotor 124 below the ground level "L". The sensor may include any other type of sensing element that provides the electronic signal of the depth of the rotor 124 below the ground level "L".

The rotor position indication system 300 also includes a controller (not shown). The controller is communicably coupled to the sensor, the first bracket 302, and the second bracket 304. The controller receives the electronic signal indicative of the depth of the rotor 124 below the ground level "L" from the sensor. Further, the controller adjusts the position of the first bracket 302 and/or the second bracket 304 based on the electronic signal received from the sensor to indicate the position of the rotor 124.

More particularly, if the depth of the rotor 124 changes from the first depth "D1" (see FIG. 3) to the second depth "D2" (see FIG. 4), the controller receives the information regarding the change in the depth from the sensor. Accordingly, the controller may send signals to an actuator (not shown) associated with each of the first and second brackets 302, 304 to rotate the first and second brackets 302, 304. Thus, based on the received electronic signal, the position of the first and/or second brackets 302, 304 are adjusted in order to illustrate the front impact point 210 of the rotor 124 with the first light signal "S1" and the rear impact point 212 of the rotor 124 with the second light signal "S2". Further, based on the height of the rotor 124 above the ground level "L", the first and second light signals "S1", "S2" at the front and rear impact points 210, 212 respectively re-align with the graduating transverse width "W" of the rotor 124.

The controller may embody a single microprocessor or multiple microprocessors. Numerous commercially available microprocessors can be configured to perform the functions of the controller. The controller may include all the components required to run an application such as, for example, a memory, a secondary storage device, and a processor, such as a central processing unit or any other means known in the art. Various other known circuits may be associated with the controller, including power supply circuitry, signal-conditioning circuitry, solenoid driver circuitry, communication circuitry, and other appropriate circuitry.

According to another embodiment of the present disclosure, the rotor position indication system 300 may include a single light emitting device mounted on the first side plate 122 of the milling machine 100. More particularly, the single light emitting device emits a light signal that aligns with the front impact point 210 and the rear impact point 212 one at a time. In such an embodiment, an operation of the light emitting device is controlled by an operator of the milling machine 100, such that the operator can toggle between controlling the alignment of the light signal with the front and rear impact points 210, 212 respectively. Operator controls provided in the operator platform 118 of the machine may be utilized for the toggling between alignment of the light signal with the front and rear impact points 210, 212 respectively. For example, on pressing one button on a joystick, the light emitting device may transmit the light signal illustrating the front impact point 210. Whereas, on pressing another button, the light emitting device may transmit the light signal aligning with the rear impact point 212. Further, the rotor position indication system 300 may also include another such similar light emitting device mounted at the left side of the milling machine 100.

The first and second brackets 302, 304 may be movably coupled to the first side plate 122 using any joining process known in the art. Further, the first and second light emitting devices 306, 308 may be fixedly coupled to the first and second brackets 302, 304 respectively, so that the first and second light emitting devices 306, 308 rotate with the first and second brackets 302, 304. The first and second light emitting devices 306, 308 may be coupled to the first and second brackets 302, 304 respectively, using welding, brazing, soldering, mechanical fasteners, or any other known technique.

INDUSTRIAL APPLICABILITY

The present disclosure relates to the rotor position indication system 300. The rotor position indication system 300 generates light signals that illustrate the front and rear impact points 210, 212 of the rotor 124. The rotor position indication system 300 makes use of fan lasers for generating the light signals. The fan lasers emit the light signals which extend perpendicular to the side plates on the ground surface 126 after striking the side plates due to inherent properties of the fan lasers. The light signals are easy to view by the operator seated within the operator platform 118. Thus, the operator is made aware of the position of the rotor 124 and also if the front and rear impact points 210, 212 of the rotor 124 align with an end of cut and start of cut respectively.

The rotor position indication system 300 includes few components that may be easily available in the market at low prices, and thus the rotor position indication system 300 provides a cost efficient system of position indication. Further, the rotor position indication system 300 allows monitoring of the position of the rotor 124 on a real time basis. Thus, the operator is made aware of a distance between the rotor 124 and any obstacles that are present in a route of the milling machine 100, thereby allowing the operator to take precautions to avoid collision with the obstacles.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

The invention claimed is:

1. A rotor position indication system for a milling machine, the rotor position indication system comprising:
   a height-adjustable rotor having a plurality of cutting tools and a front impact point, wherein during a cutting process the rotor removes a layer from a ground surface creating a milled ground surface and the front impact point is a point on the ground surface where cutting will stop if the cutting process is terminated; and
   a light emitting device configured to emit a light signal, the light signal illustrating the front impact point, wherein the light emitting device is adapted to move based on a movement of the rotor.

2. The rotor position indication system of claim 1, wherein the light signal illustrates the front impact point by pointing to a side plate at a position corresponding to the front impact point of the rotor.

3. The rotor position indication system of claim 2 further comprising:
   a bracket mounted on the milling machine, wherein the light emitting device is coupled to the bracket.

4. The rotor position indication system of claim 3, wherein the bracket rotates mechanically based on a movement of the side plate.

5. The rotor position indication system of claim 4 further comprising:
   a sensor configured to generate the electronic signal of the depth of the rotor below the ground surface; and
   a controller communicably coupled to the sensor and the bracket, the controller configured to:
     receive the electronic signal from the sensor; and
     adjust a position of the bracket based on the electronic signal received from the sensor.

6. The rotor position indication system of claim 5, wherein an operation of the light emitting device is configured to be controlled by an operator, such that the operator can toggle between controlling the illustration of the front impact point and a rear impact point respectively by the light signal.

7. The rotor position indication system of claim 5, wherein a light signal at each of the front impact point and a rear impact point respectively are configured to re-align with a graduating transverse width of the rotor based on a height thereof.

8. The rotor position indication system of claim 1, wherein the light emitting device is mounted on at least one side plate of the machine, such that the light signal is configured to extend perpendicular to the at least one side plate.

9. The rotor position indication system of claim 8, wherein a bracket rotates based on receipt of an electronic signal of a depth of the rotor below the ground surface.

10. The rotor position indication system of claim 1, wherein the light emitting device is configured to emit another light signal illustrating a rear impact point, wherein the rear impact point is a point on the ground surface where the cutting will begin if the cutting process is commenced.

11. The rotor position indication system of claim 1 further comprising another light emitting device configured to emit a light signal illustrating a rear impact point, wherein the rear impact point is where the plurality of cutting tools impact the top of the ground surface towards rear of the rotor.

12. A rotor position indication system for a milling machine operating on a ground surface, the rotor position indication system comprising:
   a height-adjustable rotor having a plurality of cutting tools and a rear impact point, wherein during a cutting process the rotor removes a layer from a ground surface creating a milled ground surface and the rear impact point is a point on the ground surface where cutting will begin if the cutting process is commenced;
   a light emitting device configured to emit a light signal, the light signal illustrating the rear impact point; and
   a bracket mounted on the milling machine,
   wherein the light emitting device is coupled to the bracket,
   wherein the light emitting device is mounted on a side plate of the machine, and the light signal is configured to extend perpendicular to the side plate, and
   wherein the bracket rotates based on a change in a height of the side plate.

13. The rotor position indication system of claim 12, wherein the light emitting device is configured to emit another light signal illustrating a front impact point, the front impact point is a point on the ground surface where the cutting will stop if the cutting process is terminated.

14. A cold planer comprising:
   a rotor chamber having a side plate and a height-adjustable rotor, wherein the rotor includes a plurality of cutting tools and has a front impact point, wherein during a cutting process the rotor removes a layer from a ground surface creating a milled ground surface and the front impact point is a point on the ground surface where cutting will stop if the cutting process is terminated; and
   a first light emitting device configured to emit a light signal, the light signal illustrating the front impact point, wherein the first light emitting device is adapted to move based on a movement of the rotor.

15. The cold planer of claim 14 further comprising a second light emitting device configured to emit a light signal illustrating a rear impact point, wherein the rear impact point is a point on the ground surface where the cutting will begin if the cutting process is commenced.

16. The cold planer of claim 15, wherein a first set of the first light emitting device and the second light emitting device are provided on one side of the cold planer, and a second set of the first light emitting device and the second light emitting device are provided on an opposite side of the cold planer.

* * * * *